(12) United States Patent
Labounsky et al.

(10) Patent No.: US 6,185,486 B1
(45) Date of Patent: *Feb. 6, 2001

(54) AIR VEHICLE LANDING/TAKEOFF AREA MAPPING SYSTEM AND METHOD

(75) Inventors: Alexander Labounsky, Buena Park; Stanley Schneider, Rancho Palos Verdes, both of CA (US)

(73) Assignee: McDonnell Douglas Corporation, Seal Beach, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/067,678

(22) Filed: Apr. 28, 1998

(51) Int. Cl.[7] ...................................................... G01S 1/68
(52) U.S. Cl. ............................ 701/15; 340/947; 340/972; 701/16
(58) Field of Search ................................. 701/15, 16, 17; 342/35, 33; 340/972, 976, 947, 952, 981, 982

(56) References Cited

U.S. PATENT DOCUMENTS

| | | | |
|---|---|---|---|
| 3,671,963 | * 6/1972 | Assouline et al. | 342/53 |
| 3,952,308 | * 4/1976 | Lammers | 342/410 |
| 4,890,110 | * 12/1989 | Kuwahara | 342/35 |
| 4,940,986 | 7/1990 | Huguenin . | |
| 5,047,783 | 9/1991 | Hugenin . | |
| 5,202,692 | 4/1993 | Huguenin et al. . | |
| 5,218,360 | 6/1993 | Goetz et al. . | |
| 5,351,077 | 9/1994 | Lee et al. . | |
| 5,483,241 | 1/1996 | Waineo et al. . | |
| 5,593,114 | 1/1997 | Ruhl . | |
| 5,654,890 | 8/1997 | Nicosia et al. . | |

FOREIGN PATENT DOCUMENTS

404346091 * 12/1992 (JP) ...................................... 342/35

* cited by examiner

Primary Examiner—Michael J. Zanelli
Assistant Examiner—Eric M Gibson
(74) Attorney, Agent, or Firm—Brooks & Kushman P.C.

(57) ABSTRACT

An air vehicle landing/takeoff area mapping system includes a plurality of transmitters located in the landing/takeoff area with each transmitter propagating a signal having a signal frequency indicative of the transmitter location. A receiver is located on the air vehicle and is capable of scanning the landing/takeoff area. The receiver processes a received transmitter signal to produce an output based on the received transmitter signal frequency. Control logic processes a sequence of receiver outputs to produce an image of the landing/takeoff area on a display device located within the air vehicle to assist a pilot during landings and takeoffs of the air vehicle under either clear or inclement weather conditions and/or either day time or night time visibility.

20 Claims, 3 Drawing Sheets

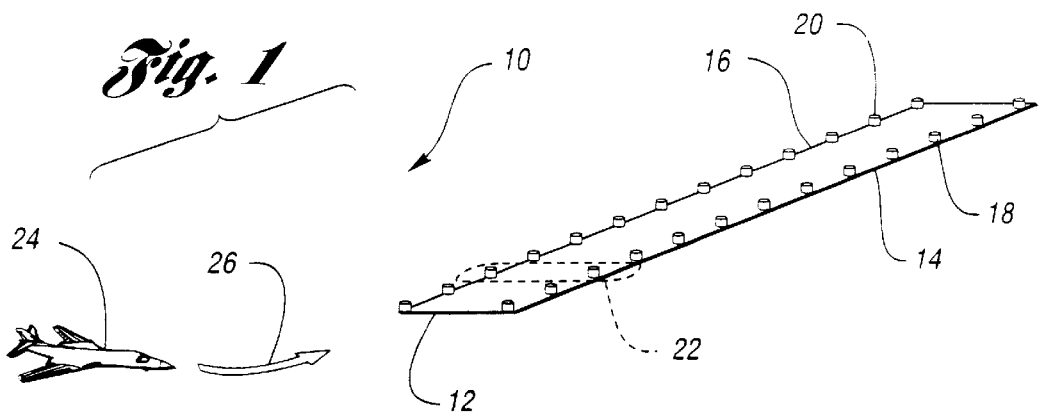
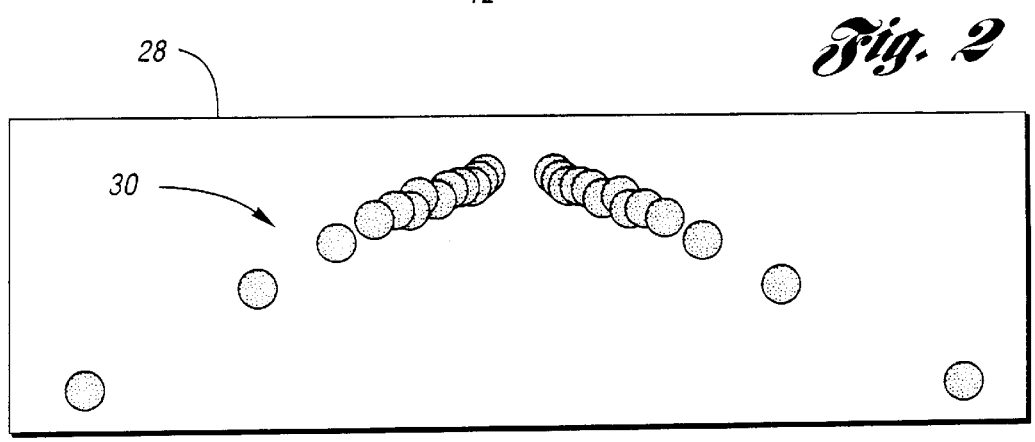
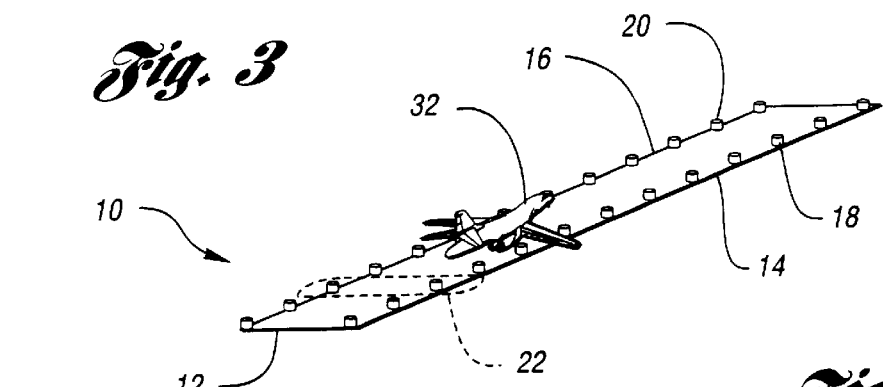
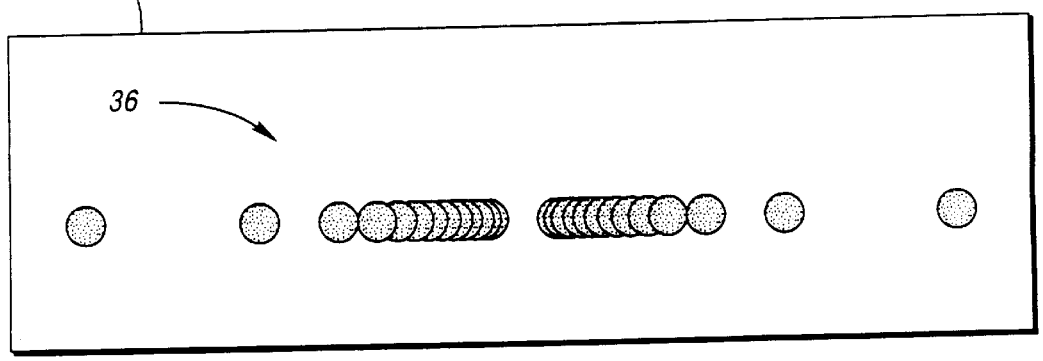

AIR VEHICLE LANDING/TAKEOFF AREA MAPPING SYSTEM AND METHOD

TECHNICAL FIELD

The present invention relates to air vehicle landing/takeoff area mapping systems and methods.

BACKGROUND ART

Heavy fog and other reduced visibility weather conditions make aircraft landings and takeoffs difficult for the pilot. Presently, there are sensor systems on aircraft that attempt to alleviate this problem. Forward Looking Infrared (FLIR) sensors can enhance night time viewing of the runway ahead; however, FLIR sensing is obscured by heavy fog. There is also the Instrumented Landing System (ILS), which utilizes Ultra High Frequency (UHF) technology, to assist the pilot in landing an aircraft during reduced visibility conditions. Still, ILS has shortcomings. ILS does not provide a real-time processed runway outline on a cockpit display device. ILS loses its effectiveness at altitudes less than 100 feet above the runway, where visibility may still be impaired by dense fog. ILS only assists within limits in aircraft landing operations, and is not useful in aircraft takeoffs. Further, ILS may lose effectiveness due to multipath signals, such as those from other nearby runways, aircraft, and/or reflections from buildings and all other structures and outcroppings of the general locale.

U.S. Pat. Nos. 4,940,986 issued to Huguenin and U.S. Pat. No. 5,351,077 issued to Lee et al. describe runway mapping systems. Both of these patents describe the use of power sources on known airport features. The power sources radiate frequency modulated (FM) and amplitude modulated (AM) millimeter wave signals, respectively. A video detection sensor camera uses a lens array to focus an image of the power sources onto a receiver array of a large number of receiving sensors. Thus, the relative locations in the array of the particular sensor or sensors outputting received signal power is indicative of the relative locations of the external power sources. Only aircraft landings are addressed by these two patents.

A primary disadvantage associated with existing runway mapping systems, including those systems which utilize AM signals with a corresponding camera-based receiver array on the aircraft, is the fact that the transmitters and the receiver array are complex and costly. Potential ambiguities introduced via aircraft motion-induced Doppler frequency shifts necessitate a complicated receiving and data processing system, which may still be prone to residual errors in identifying particular locations of emitting sources.

Passive systems that rely only on terrain intrinsic emissivity, in which active emitting sources are absent, are disadvantaged relative to systems employing active emitters by: (1) low emission intensities, which are additionally and markedly attenuated by non-ideal weather conditions, such as fog: and (2) inherently low contrast between the different terrain features, such as runway tarmacs versus grass turf.

DISCLOSURE OF THE INVENTION

It is, therefore, an object of the present invention to provide an improved air vehicle landing/takeoff area mapping system and method capable of takeoff and landing assistance that is functional in reduced visibility weather conditions.

It is another object of the present invention to provide an air vehicle landing/takeoff area mapping system utilizing transmitter and receiver components of relatively inexpensive construction.

In carrying out the above objects and other objects and features of the present invention, an air vehicle landing/takeoff area mapping system is provided. The system comprises a plurality of transmitters located in the landing/takeoff area. Each transmitter propagates a signal having a signal frequency indicative of transmitter location. A receiver located on the air vehicle is capable of scanning the landing/takeoff area. The receiver processes a received transmitter signal to produce an output based on the received transmitter signal frequency. Control logic processes a sequence of receiver outputs to produce an image of the landing/takeoff area on a display device within the air vehicle. The image assists the pilot or operating crew during landings and/or takeoffs, as desired.

Preferably, each transmitter has a substantially hemispherical antenna field pattern. Further, the propagated signals are preferably continuous wave signals, and are microwave band or millimeter waves.

Still further, in a runway embodiment, the plurality of transmitters include first transmitters and second transmitters. The first transmitters are located along the first side of the runway. Each first transmitter propagates a signal with a distinct signal frequency relative to the other first transmitters. The second transmitters are located along the second side of the runway. Each second transmitter propagates a signal with a distinct signal frequency relative to the other second transmitters.

Preferably, the receiver further includes a first stage for receiving the propagated signals, and at least one frequency down conversion stage connected to the first stage. A channelizer for frequency channelizing the signals after frequency down conversion is coupled to the down conversion stage or stages. The channelizer has a separate output for each channel; the control logic receives and processes the outputs.

Further, in a preferred embodiment, a storage medium has information stored thereon representing pre-assigned transmitter locations based on signal frequency. The control logic produces the landing/takeoff area image further based on the stored information.

Further, in carrying out the present invention, an air vehicle landing/takeoff area mapping system comprising a plurality of transmitters, a receiver, a display device, and control logic is provided. The control logic processes receiver information including a sequence of receiver outputs, corresponding transmitter azimuth scan angles, and corresponding transmitter elevation scan angles to produce an image of the landing/takeoff area on the display device. Preferably, the control logic further processes air vehicle avionics information including altitude, heading angle, pitch angle and/or other navigational information to produce the landing/takeoff area image on the display device.

Still further, in carrying out the present invention, a method of mapping an air vehicle landing/takeoff area comprises propagating a plurality of signals from a corresponding plurality of locations in the landing/takeoff area, scanning the landing/takeoff area from an air vehicle to receive the signals, processing each received signal to produce an output based on the received signal frequency, and processing a sequence of outputs to produce a landing/takeoff area image.

The functional advantages accruing to the present invention are numerous. Embodiments of the present invention provide systems and methods for air vehicle landing/takeoff area mapping which are capable of assisting the pilot or operating crew in both takeoffs and landings. Further, embodiments of the present invention may be constructed with relatively inexpensive components because the propagated signal information may advantageously be the frequency of an unmodulated transmitter signal. Still further, embodiments of the present invention may advantageously employ a strictly passive receiver on the aircraft, which may be particularly advantageous in military applications. The passive receiver does not support the enemy foe to home in on the aircraft.

While embodiments of this invention are illustrated and disclosed, these embodiments should not be construed to limit the claims. It is anticipated that various modifications and alternative designs may be made without departing from the scope of this invention.

BRIEF DESCRIPTION OF THE DRAWINGS

FIG. 1 is an aircraft runway mapping system, shown assisting an aircraft landing;

FIG. 2 is a cockpit video display device as seen by the pilot in the landing aircraft of FIG. 1;

FIG. 3 is an aircraft runway mapping system, shown assisting an aircraft takeoff;

FIG. 4 is a cockpit video display device as seen by the pilot in the taking-off aircraft of FIG. 3;

BEST MODES FOR CARRYING OUT THE INVENTION

Figure 5:
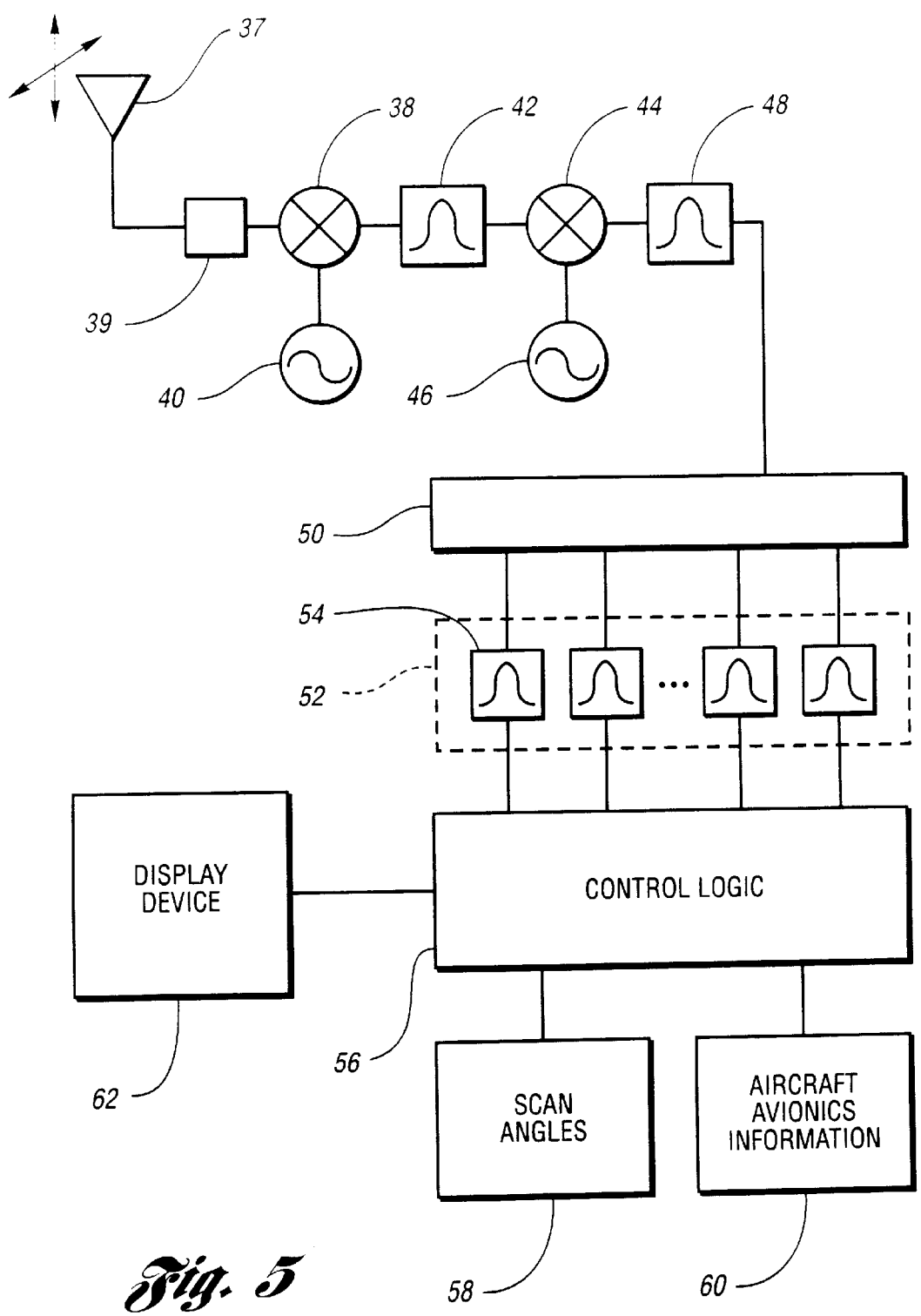
FIG. 5 is a diagram illustrating a scanning receiver, associated control logic, and a cockpit display device.

Certain terminology will be used in the following description for convenience in reference only and will not be limiting. The terms "air vehicle" and "aircraft" are used interchangeably to designate an air vehicle, and are each meant to encompass all air vehicles including aircraft, helicopters, dirigibles, gliders, and all other airborne and/or re-entering vehicles, as well as spaceborne vehicles.

The term "landing/takeoff area" and similar terms are meant to encompass the entire locale where any air vehicle may land or takeoff, including surrounding features such as buildings, landmarks, etc. Further, the "landing/takeoff area" may be located at an airport, heliport, spacecraft port, temporary military landing/takeoff strip, or any other area at which air vehicles land, takeoff, or taxi.

With reference to FIG. 1, an air vehicle landing/takeoff area mapping system of the present invention is generally indicated at 10. A runway 12 has a first side 14 and a second side 16. A plurality of transmitters includes first transmitters 18 located along first runway side 14, and second transmitters 20 located along second runway side 16. Each transmitter propagates a signal having a signal frequency indicative of transmitter location. The tagging of the signal frequency with a particular transmitter is a preferred embodiment. More than one location can use a given frequency provided that the separation of those locations is large enough to avoid ambiguities and confusion in the aircraft receiver/processor.

The information contained in the propagated signal is represented by the signal's frequency, which advantageously allows lower-cost transmission of unmodulated signals as compared to modulated signals. Preferably, each first transmitter 18 propagates a signal with a distinct signal frequency relative to the other first transmitters; and, each second transmitter 20 propagates a signal with a distinct signal frequency relative to the other second transmitters. Transmitter pairs at the same distance along the length of the runway such as transmitter pair 22, may propagate the same frequency, if desired.

Preferably, the transmitter frequencies along a runway edge vary in a predetermined fashion, such that the control logic of a receiver in the aircraft may be preprogrammed with frequency information and relative transmitter locations to facilitate image generation on the cockpit video display system. Of course, preprogramming of the control logic is preferred, but is optional. Further, it is to be appreciated that selection of transmitter frequencies for embodiments of the present invention is a design choice. In one extreme case, all transmitters along a runway edge have different frequencies such that maximum information is transmitted. In another extreme case, all transmitters along a runway edge have the same frequency such that minimal information is transmitted. That is, the term "indicative of transmitter location" as used herein means that the signal frequency is indicative of transmitter location to the extent possible with the design choices made for transmitter frequency selection. Hence, "indicative" may mean that the transmitter is any transmitter of a group of transmitters having the same frequency in the employed design scheme. The design choice for frequency assignments is based on several factors, as will be described.

With continuing reference to FIG. 1, an aircraft 24 is depicted in a landing approach, traveling in the direction indicated by arrow 26. As aircraft 24 approaches the runway 12, the display device 28 in the cockpit of aircraft 24, as best shown in FIG. 2, will display a runway image 30.

As shown in FIG. 3, an aircraft 32 has landed on the runway 12, and is preparing for takeoff. As best shown in FIG. 4, display device 34 displays a runway image 36.

In FIGS. 1 and 3, the runway transmitters are approximately equally spaced, and each preferably has a substantially hemispherical antenna field pattern. The advantage of a hemispherical pattern is that landings and takeoffs in either of the two opposing directions can be assisted by this system. Further, the propagated signals preferably have millimeter wavelengths or may be microwave band waves, if such a system is desired. The following detailed description of the runway transmitters is meant to describe a preferred embodiment thereof; alternatives are contemplated. The transmitters may be relatively low power radio frequency (RF) transmitters operating preferably in a continuous wave mode that may be either interrupted or uninterrupted. However, uninterrupted continuous wave mode is preferred to ensure detectability by aircraft at all times. Each transmitter transmits a signal that may advantageously be unmodulated such that signal information is indicated by signal frequency and transmitter location relative to where the receiver is located. That is, selecting different frequencies for transmitters nearby each other allows the receiver to distinguish between transmitters in close proximity of each other, in those cases where the receiver antenna's main beam field pattern may encompass more than one transmitter.

Frequencies may be repeated at further distances, or on opposite sides of the same runway, as desired by the system designer. Transmitter frequency preferably is stabilized with a phase-locked loop to prevent drift; however, the transmitters preferably are free running and operate without phase locking in a non-coherent mode. When operating in a non-coherent node, it is preferable to provide thermal stabilization for the transmitter to avoid excessive frequency drift. The center operating frequencies are preferably in the 94–95 GHz millimeter wave frequency band to ensure improved angular resolution, reduced multipath signal problems, and minimized atmospheric attenuation. However, lower frequencies, such as 30 GHz may be used, if desired, to further reduce atmospheric attenuation at the expense of a decrease in antenna resolving power. Still further, higher frequencies such as those near or above 1 THz may be used, if desired in relation to technology availability.

At distant aircraft ranges when the antenna beam subtends small angles relative to the runway edges, there is a possibility that the signals from multiple transmitters are intercepted by the same antenna beam in the same beam position. To effectively deal with these receptions, multiple transmitters in the same beam position are preferably identified by distinct frequency assignments. Each transmitter operates at a center frequency of a designated channel of channel width sufficiently wide enough to accommodate transmitter frequency drift and/or Doppler shift.

In most cases, the antenna beam will never simultaneously encompass transmitters on both sides of the runway. Consequently, when scanned across the field of view from one side of the runway to other, the beam will either receive the signals from one side or the other side of the runway, but probably not both together in the same antenna beam position. Therefore, the frequency channel assignments for the transmitters on one side can be repeated for the transmitters on the other side. Beyond that, it may be possible to configure an overall system design to reduce the number of separate frequency channel assignments that can be standardized for universal use. One possible standardized assignment, for example, orders the transmitters in ascending frequency order from one end of the runway to the other end of the runway.

Of course, as a design choice, there are many possible frequency assignment configurations. Some factors that determine a frequency assignment configuration are: number of and relative positions of the transmitters, overall available bandwidth, expected frequency drift at the transmitters and/or Doppler shift at the receiver, scanning antenna beamwidth, and maximum receiver-to-transmitter separation and geometry for operation of the system.

Further, transmitter frequency channel width selection is based on several factors. Transmitter frequency stability and drift play a role in selection. The worst case would be a free-running 94 GHz Gunn diode oscillator whose base transmitter would require several MHZ of channel width to tolerate its frequency shifts. Another factor is aircraft motion Doppler frequency shifts. For example, the Doppler frequency shift for a turbo-prop aircraft having a typical velocity of about 72.8 m/s (293 ft/s) may be about 60 kHz at 94 GHz. For a fighter aircraft, having a typical velocity of about 304.8 m/s (1 kft/s), the Doppler shift may be about 200 kHz at 94 GHZ. Thus, depending on the specifics of the actual system design, the transmitter frequency channel width could be as large as several MHZ. A channel width of 10 MHZ at 94 GHZ is suggested to encompass all possible conditions, including unimpeded discrimination between adjacent transmitters and worst-case transmitter drift.

The transmitters may be powered by direct power conduits buried in the ground along the runways or, due to low power requirements, by batteries as appropriate to military field applications. The direct power conduits could be the same ones that power existing "blue" border lights that line the two side edges of runways and other areas of airports.

Referring to FIG. 5, a scanning receiver and associated control logic and display device, all located in the aircraft, are illustrated. A scanning antenna 37, such as a high gain millimeter wavelength 1 ft. diameter mechanically-scanned dish reflector with a 94–95 GHz gain of 45 dB and a beamwidth of approximately 0.73 degrees, is mechanically scanned in azimuth (left,right) and elevation (up,down) per, for example, a raster pattern and receives a radio frequency (RF) signal propagated from a runway transmitter. An advantage of a 1 ft antenna aperture is that it can readily be installed in available space behind aircraft nose radomes or in a separate radome pod.

The receiver processes the received transmitter signal to produce an output based on the received transmitter signal frequency. In a preferred embodiment, scanning antenna 37 is the first stage of the receiver, and receives the propagated signals. An optional low-noise amplifier 39 may be placed between the antenna 37 and mixer 38. At least one frequency down conversion stage is connected to the first stage. As shown, mixer 38, sinusoidal source 40, and filter 42 mix down the received signal to an intermediate frequency (IF). Further, another mixer 44, another sinusoidal source 46, and another filter 48 may be employed to mix down the intermediate frequency (IF) at the output of filter 42 to an even lower intermediate frequency (IF) at the output of filter 48. This second stage of frequency down conversion is optional and depends on receiver design tradeoffs.

The output of filter 48 is connected to a channelizer for channelizing the signals. The channelizer has separate outputs for each channel. The preferred way to channelize one or more received signals is with a splitter 50. The splitter has a group of duplicate outputs that contain the spectral content of the one or more signals intercepted by the antenna beam. Each of the outputs of splitter 50 is inputted to a separate IF channel receiver making up the group of IF channel receivers 52. Each IF channel receiver 54 is tuned to the center frequency of the particular IF channel pre-assigned to it and is bandpass filtered to only receive signal spectral content within its preassigned channel width and to reject all other IF channels.

Finally, each IF channel receiver 54 performs a final down-conversion to baseband for signal detection. The group of IF channel receivers 52 provide a plurality of discrete outputs, any one of which will be asserted when a signal within the appropriate frequency channel is received at scanning antenna 37.

Control logic 56 processes a sequence of receiver outputs. Further, control logic 56 processes corresponding receiver azimuth scan angles and corresponding receiver elevation scan angles from scan angles logic 58. That is, control logic 56 determines a three-dimensional perspective runway image based on each occurrence of an asserted channel output, and the associated orientation of the receiver antenna 37 based on the instantaneous azimuth and elevation scan angles when the particular channel output is asserted.

Still further, control logic 56 preferably processes aircraft avionics information including altitude, heading angle, and pitch angle from aircraft avionics information logic 60. The control logic 56 processes all received information to produce a runway image on a display device 62. Of course, other aircraft information available from other internal avionics may also be used by control logic 56. In addition, control logic 56 is configured to operate under degraded conditions caused by the loss of one or more of the aircraft avionics inputs.

In a preferred embodiment, a storage medium that is accessible by control logic 56 has information stored thereon representing pre-assigned transmitter locations based on signal frequency. The control logic 56 further processes the stored information along with the received information to produce the runway image.

As best shown in FIGS. 2 and 4, runway images may appear as a plurality of dots, some of which are smeared together. The actual placements of these dots onto the display device depend on a variety of conditions, including frequency assignment configuration. Preferably, dot placements are based on the receiver antenna beam pointing angles (azimuth and elevation angles), assigned frequency channel occupancy information outputted by the channel output (at IF channel receiver group 52), stored data (if available) on the relative runway locations of the transmitters individually tagged to frequency channel assignments, and data extrapolation and regression processing to construct an image of the runway ahead of the landing or taking-off aircraft.

A certain number of runway transmitters closest to the approaching aircraft are detected unambiguously (i.e, one transmitter and the detection of its signal per antenna beam position). Each unambiguous detection and its associated antenna beam position result in a calculated estimate of transmitter runway location by control logic 56. Thus, a certain number transmitter runway locations closest to the approaching aircraft are unambiguous, which makes valid the overall regression processing of not only the close-in unambiguous data, but the farther out ambiguous data as well.

As such, the unambiguous data is primary to the processing and the ambiguous data serves as additional confirmation of the regression's slope and orientation for the runway edges on the cockpit video display. In this context, the ambiguous data, taken together with the frequency channel occupancies, antenna beam azimuth and elevation pointing angles, and other aircraft avionics data, in relation to the regression in process of being formed, is of value to the completion of the regression. Of course, the above items by no means form an exhaustive list of usable information for control logic 56 processing. Further, stored data on the transmitter locations on the basis of each transmitter frequency is preferred, but is optional.

With continuing reference to FIG. 5, the antenna 37 is capable of either electrical scanning or mechanical scanning. Presently, mechanical scanning is preferred due to low-cost considerations and lack of technology readiness for phase-shifter-steered planar phased arrays at MMW 94 GHz. A typical mechanical azimuth scan rate is about 36 degrees/s. Further, the antenna is preferably scanned back and forth over a range from about −45 degrees to about +45 degrees. Thus, for an exemplary beamwidth of 0.73 degrees, the beam position dwell during a continuous scan is about 20 milliseconds. The beam dwell greatly exceeds the receiver front end time constant of 0.1 microseconds, for 10 MHZ bandwidth channels. Thus, the receiver is not in any way matched to the length of the dwell and, furthermore, operates under essentially steady state conditions during the dwell on any given runway transmitter signal intercepted by the antenna beam. Therefore, the dwell can even be reduced to get the same signal-to-noise ratio by increasing the scan rate, if possible, so long as the dwell significantly exceeds the inverse noise bandwidth of the receiver.

The antenna must also have elevation scan capability to fully capture all transmitters during a complete, start-to-finish scan cycle and to compensate for the forward movement of the aircraft. This elevation steering compensation is only needed from scan retrace to scan retrace and not from dwell to dwell, because the amount of downrange movement during a single dwell is, for example, only 4 meters, based on a 200 m/s aircraft velocity and a 36 degree/s azimuth scan of a 0.73 degree beamwidth. However, elevation steering compensation incrementally from beam dwell to beam dwell can be employed for additional precision in mapping the landing/takeoff area.

Figure 6:
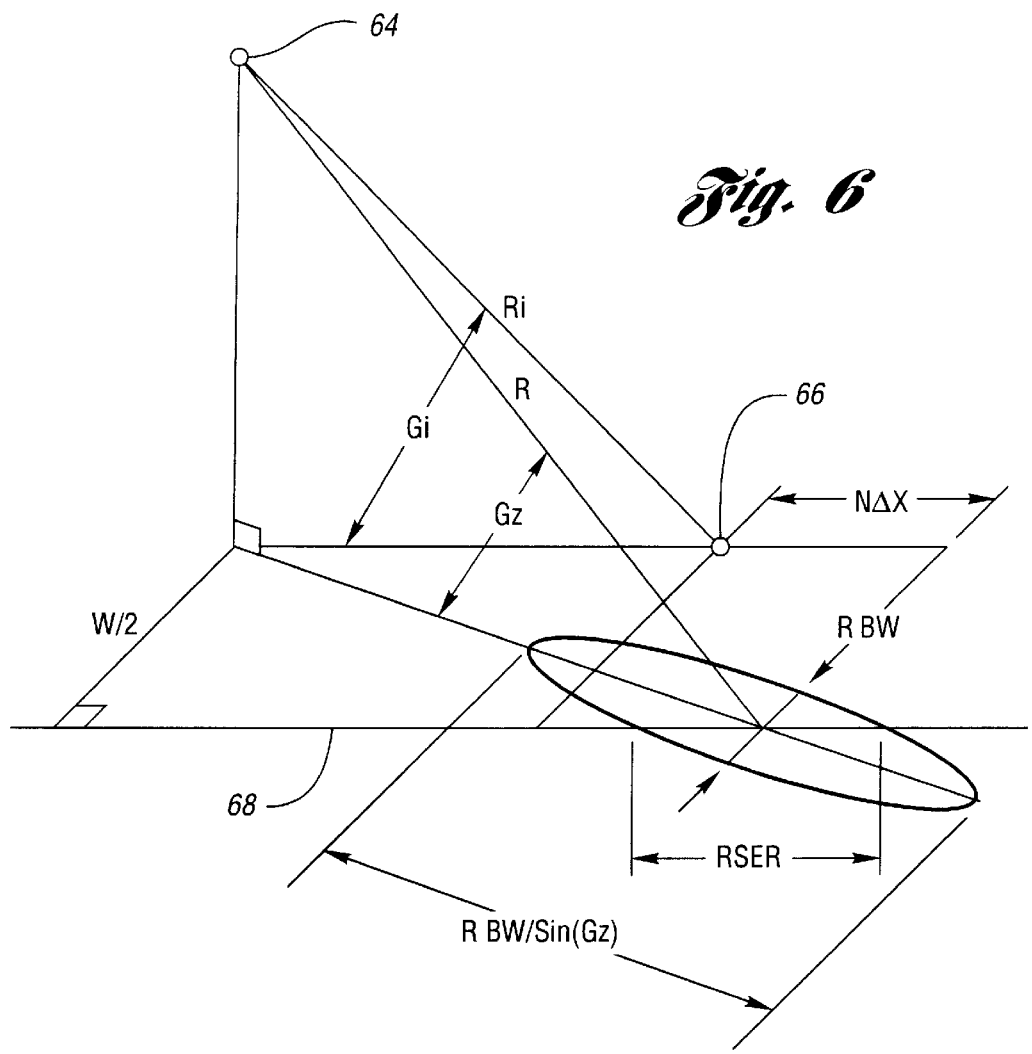
FIG. 6 is a diagram illustrating runway side edge resolution (RSER) during runway scanning.

The diagram in FIG. 6 illustrates the antenna beam field pattern on the runway side edge. The aircraft is located at point 64; point 66 falls on a line perpendicular to runway side edge 68. Transmitters are equally spaced along the runway side edge, at a distance ΔX between adjacent transmitters. As illustrated, the runway side edge resolution (RSER) is determined according to:

$$RSER \simeq BW \frac{[Ri\mathrm{Sin}(Gi)]^2 + [Ri\mathrm{Cos}(Gi) \pm N\Delta X]^2 + [W/2]^2}{\sqrt{[Ri\mathrm{Sin}(Gi)]^2 + [W/2]^2}}$$

wherein:
Ri is the initial slant range to runway reference point 66;
Gi is the initial beam grazing angle to runway reference point 66;
W is the runway width;
NΔX is the ground downrange offset from runway reference point 66 wherein ΔX is the distance between any two adjacent transmitters on the same runway side; and
BW is the beamwidth in radians.

With continuing reference to FIG. 6, R is the slant range to a particular to transmitter unit, and Gz is the associated beam-to-runway-grazing angle. In operation, transmitters toward the near end of the runway (more negative N) are individually located within the antenna beam, due to increased runway side edge resolution at nearer runway locations. Further down the runway (more positive N), as the antenna beam resolution decreases until the resolution width is too wide to capture a single transmitter in a single beam position, multiple transmitters within the same beam resolution may be effectively handled by the combined use of the beam pointing angles, assigned frequency channel occupancy information, any stored data related to the relative primary locations of the transmitters individually tied to unique frequency channel assignments, and data extrapolation and regression processing to construct a video image of the runway ahead of the landing or taking-off aircraft. Further, Global Position System (GPS) and other avionics information may additionally be employed by the control logic.

The antenna can be installed behind the aircraft's nose radome, if there is room to retrofit it while retaining existing electronic systems. However, the existing nose radome may require re-engineering to additionally provide low insertion loss at the 94–95 GHz part of the frequency spectrum. Two antenna units may also be installed within the nose radome compartment. One unit on the left side scans a 22.5 degree scan in the left quadrant and the other unit on the right side scans a 22.5 degree scan in the right quadrant.

Otherwise, the antenna can be mounted inside its own, separate radomed pod to be installed on the underside of the aircraft's fuselage, preferably nearer the fore end than the aft end. Or, two separate radomed-pod antenna units could be installed on the bottom side of the main wings, one on the left wing and the other on the right wing. In that case, the left wing pod would scan the left quadrant out to the applicable field-of-view limit and the right wing pod would scan the right quadrant out to the applicable field-of-view limit.

The high-gain antenna that could be employed is, for example, a one-foot diameter dish reflector, most likely of the Cassegrainian type, along with mechanical-scanning servos and rotation sensors. This fits into, for example, a 38.1 cm (15 in.) cylindrical radome, rounded at its bottom end, with the top end attached to the bottom of the aircraft fuselage or wing.

Another type of installation retaining left-to-right aircraft symmetry consists of mounting a mechanical-scan disk reflector or other type aperture antenna directly inside the two main wings of the aircraft. The antenna inside the left wing scans the left-view quadrant and, likewise, the antenna inside the right wing scans the right-view quadrant. Two main requirements for in-the-wing installations are (1) thickness of the wing needs to be sufficient to engulf the entire antenna and its mounting structure and (2) the applicable forward-looking surfaces of the wing need to serve as a low-insertion loss radome.

Finally, other implementations may be wing-conformal and/or fuselage-conformal electronically-scanned array antennas. In this implementation, either phase-shifter steering in both azimuth and elevation or a combination of frequency-shift steering and phase-shifter steering can be employed. Any use of frequency-shift steering in the passive receiver system would, of course, cause the local oscillator signal that feeds into the receiver's first downconversion mixer to be shifted in frequency according to a prescribed algorithm.

Consistent with the multiple frequency channel assignment plan, an exemplary system includes 20 channels, each 10 MHZ wide. Thus, the total bandwidth is 200 MHZ for such a system configured for 94 GHz, without taking into account protective, channel-separating guard bands. An advantage to keeping the front end bandwidth somewhat low, relative to 94 GHz, is that typical solid-state low noise amplifiers (LNAs) and mixers can achieve somewhat reduced noise figures (NF) if tailored to limited bandwidths.

It should be noted that the present invention applies to any number of frequency channels chosen by the systems designer of whatever bandwidths desired. Thus, the 20 channels, each 10 MHZ wide, serves only as an example and not as a limitation on the application potential of the system.

The receiver architecture of the exemplary embodiment features several stages of frequency down-conversion. Directly following the 94–95 GHz Low Noise Amplifier (LNA), the first downconversion results in a 200 MHZ bandwidth first IF signal in the high single-digit to low double-digit GHz range. The second down-conversion results in a 200 MHZ bandwidth second IF signal in the mid-hundreds of MHZ range. However, this second down-conversion is optional and may be omitted at the discretion of the system designer. The second IF signal feeds into an LNA that drives a corporate feed structure to provide 20 equal IF power output channels, each 200 MHZ wide.

The 20:1 splitter plus insertion losses in signal power experienced by each of the 20 IF output channels is made up for by an extra stage or two of solid-state IF LNA amplification. Each of the 20 IF output lines from the splitter feed in turn into, respectively, 20 IF receivers, wherein each receiver is of about 10 MHZ bandwidth and is centered on the particular frequency channel assigned to it within the 200 MHZ wide spectrum of channels. The above-described receiver architecture is one of several that can be employed to make a channelized receiver for the system.

Some advantages to making the channel subdivision losses up by more IF gain are as follows. Most of the receiving system noise is established in and dominated by the RF front end electronics (specifically the first RF LNA); and, the contribution to total receiver noise by the IF components is relatively minor. Thus, cascading additional LNAs at IF does not generally increase the noise to the point of causing the signal-to-noise ratio (SNR) to significantly diminish, as it might if cascaded in the 94 GHz RF front end. Note that current technology for 94 GHz LNAs is such that the system designer may not desire to employ them between the antenna and the first down-conversion mixer, due to relatively high noise figures (NFs). However, it is anticipated that future technological development will reduce 94 GHz LNA NFs and make such LNAs more desirable.

The principal determinant of system performance is the net signal-to-noise ratio (SNR). The SNR is given by the following:

$$SNR = \frac{P_T G_T G_R \lambda^2}{[(4\pi R)^2 k T_o (NF-1) B l_A R L_s]}$$

where exemplary values are given parenthetically (and gains are given in decibels for simplicity), and:

$P_T$ is the transmitter average power output (1 W);
$G_T$ is the transmitter antenna gain (4 dB);
$G_R$ is the receiver antenna gain (45 dB);
$\lambda$ is the RF wavelength (3.19 mm);
R is the receiver-to-transmitter slant range (1.6 km)
k is Boltzmann's constant ($1.38 \times 10_{-23}$ J/K);
$T_C$ is the receiver standard reference noise temperature (290 K);
NF is the receiver noise figure (7 dB);
B is the receiver noise bandwidth (10 MHZ);
$l_A$ is the heavy fog attenuation constant (12 dB/km); and
$L_S$ is the receiver system losses (5 dB).

For the above parameter set, the resulting SNR is about 16.6 dB, which is more than adequate for continuous wave detection. Detection of continuous wave signals is possible at low single-digit SNRs, but extra SNR margin is preferred to cover contingencies and variations. Assuming a minimum of 1 dB for detection with a 10 dB margin results in an SNR objective of about +11 dB for extremely reliable detection.

The exemplary values given above for the transmitter antenna gain GT, the receiver antenna gain GR, the receiver noise figure NF, and the receiver system losses LS are given in decibels. It is to be understood that the equivalent unit/unit values should be used when calculating the signal-to-noise ratio SNR in the equation used herein. Further, the exemplary value for the heavy fog attenuation constant given above is in decibels per distance. It is to be understood that the heavy fog attenuation ($l_A \cdot R$) should be calculated as an equivalent unit/unit value when used in the signal-to-noise SNR equation used herein.

The variation in signal-to-noise ratio with the receiver-to-transmitter slant range R and fog attenuation constant $l_A$ are important for determining values for other variables in the system. Operational requirements generally categorize fog conditions in terms of runway visual range (RVR), and daytime versus night time fog conditions. There are two principal values of RVR, namely 700 feet (213.4 meters) and 150 feet (45.7 meters). For example, for signals at 94–95 GHz, night time fog attenuation for a runway visual range of about 150 feet is about 24 decibels/km. Similarly, daytime fog with a runway visual range of about 150 feet has a fog attenuation constant of about 1.6 decibels/km. Still further, for a runway visual range of about 700 feet, the daytime fog attenuation constant is about 0.8 decibels/km, and the night time fog attenuation constant is about 12 decibels/km.

By establishing a signal-to-noise ratio objective, for example, 11 decibels, transmitter power requirements can be calculated directly from the signal-to-noise ratio equation. Thus, a transmitter located 1 mile away with an average power output of 0.27 watts in the 94–95 GHz range is sufficient for a runway visual range of 150 feet in daytime fog. Advantageously, commercial off-the-shelf parts may be sufficient for most applications. Further, transmitter power bandwidth and/or increasing wavelengths, for example, to the microwave range. Usable frequencies, such as 94–95 GHZ, are determined based on attenuation properties of the atmosphere. For example, atmosphere attenuation is at local minima at about 30 GHz, and again near 94–95 GHz.

In a preferred embodiment, the transmitter signal frequency is one of low water vapor absorption. For example, about 35 GHz, 94 GHz, and 135 GHz, all provide low water vapor absorption, which allows small compact equipment.

The attenuation of the emitted signal is predominantly governed by Rayleigh scattering losses. These losses vary as the fourth ($4^{th}$) power of frequency. Therefore, microwaves are preferable to millimeter waves from this point of view. However, a larger receiver antenna aperture is required to accommodate the use of microwaves instead of millimeter waves. It is preferred to use microwaves when aperture size limitations do not make it impractical. Within the microwave band are frequencies having low water absorption, such as, for example, the high-Ku band at 16–18 GHz.

Still further, for increasing transmitter power requirements, traveling wave tubes may furnish the necessary larger transmitter power output. Still further, to reduce transmitter-required power, other antenna field patterns may be used for the transmitters other than hemispherical antenna field patterns. For example, a large cone directed toward the incoming aircraft will allow for increased transmitter antenna gain to reduce transmitter power requirements.

In one embodiment, transmitters are spaced along each runway side edge with about 1 kft between adjacent transmitters. The transmitters along one runway side are about 200 feet from the transmitters along the other side of the runway. Of course, there are many configurations for frequency assignment and transmitters placement, in addition to many variations for the control logic depending on the desired complexity and amount of available runway information for control logic preprogramming.

Figure 7:
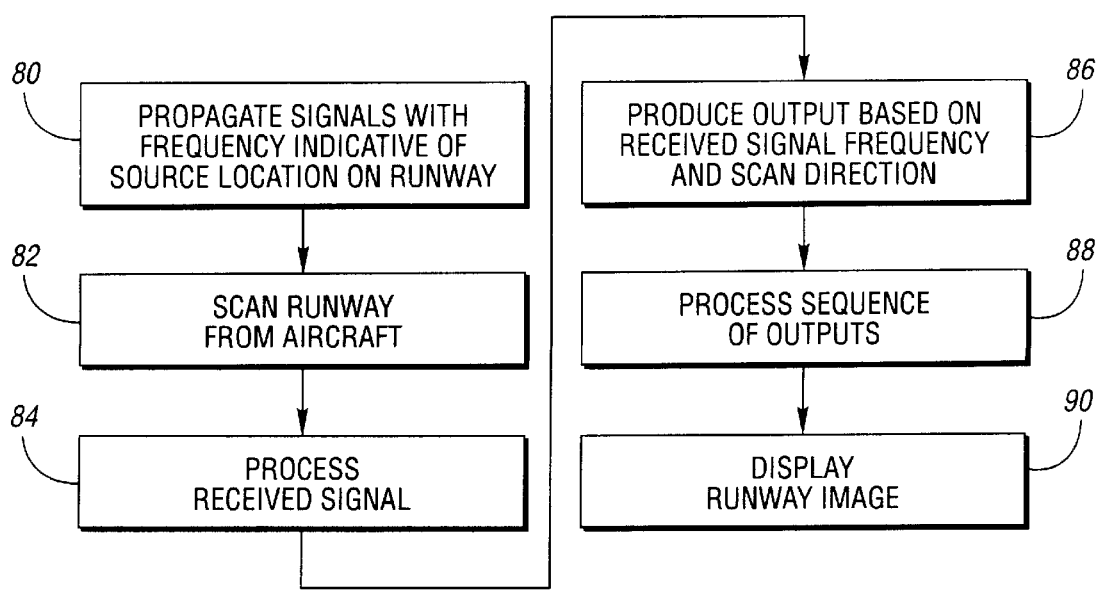
FIG. 7 is a block diagram illustrating a method of the present invention for runway mapping.

Referring to FIG. 7, a method of the present invention will now be described. At block 80, signals are propagated from corresponding locations along the runway. Each signal has a signal frequency indicative of a corresponding location on the runway. Preferably, nearby transmitters along the same side of the runway have different frequencies. The varying of the frequencies among the different transmitters facilitates image generation by the control logic. At block 82, the runway is scanned from the aircraft. The scanning is preferably mechanical; however, electrical methods of scanning may be contemplated, comprising phased array and/or frequency-shift steering. Another embodiment may employ both electronic and mechanical scan. At block 84, received signals are processed.

At block 86, outputs are produced based on the received transmitter signal frequency. That is, a plurality of signal detectors provide discrete outputs indicative of the presence of signals in the respective channels. At block 88, a sequence of outputs are processed, along with scan angle and aircraft avionics information to produce an image. At block 90, a runway image is produced and displayed on the display device, located in the cockpit of the aircraft.

The present invention has numerous advantages that should be appreciated by one of ordinary skill in the art of air vehicle landing/takeoff area mapping systems and methods. For example, in selected warfare environments, such as temporary airstrips used in tactical warfare, it is preferred to turn off the visible lights along air landing strips and rely on aircraft runway mapping systems. Embodiments of the present invention may be used very effectively in such environments.

Further, it should be appreciated that the embodiments of the present invention eliminate the requirements for transmitter modulation with unmodulated, substantially fixed-frequency transmitters as a preferred embodiment.

Embodiments of the present invention may be functional in a large variety of environmental conditions, for example, clear, rain, snow, fog, and other obscurants including heavy, dense fog. Preferably, a substantially hemispherical antenna field pattern allows a longer and larger field operation of the air vehicle and its approaching or leaving of the runway. This further allows pilots or operating crews of air vehicles approaching from any arbitrary direction to visually compare on a display screen the orientation of the runway and other nearby terrain features to the direction of arrival of the air vehicle, so as to make course corrections.

Of course, it is to be appreciated that transmitters may be located anywhere in the landing/takeoff area which includes surrounding terrain and landmark points in the general area for air vehicle landings and takeoffs.

While embodiments of the invention have been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. An air vehicle landing/takeoff area mapping system comprising:
   a plurality of transmitters located in the landing/takeoff area, each transmitter propagating an effectively unmodulated signal having a frequency indicative of transmitter location;
   a non-camera receiver having a scanning antenna located on the air vehicle and operative to scan the landing/takeoff area, the receiver being further operative to process a received transmitter signal to produce an output based on the received transmitter signal frequency;
   a display device located within the air vehicle; and
   control logic for processing a sequence of receiver outputs to produce an image of the landing/takeoff area on the display device to assist a pilot during landings and takeoffs of the air vehicle.

2. The air vehicle landing/takeoff area mapping system of claim 1 wherein each transmitter has a substantially hemispherical antenna field pattern.

3. The air vehicle landing/takeoff area mapping system of claim 1 wherein the propagated signals are continuous wave signals.

4. The air vehicle landing/takeoff area mapping system of claim 3 wherein the propagated signals are millimeter waves.

5. The air vehicle landing/takeoff area mapping system of claim 3 wherein the propagated signals are microwave band waves.

6. The air vehicle landing/takeoff area mapping system of claim 1 wherein the landing/takeoff area is a runway having first and second sides, and wherein the plurality of transmitters further comprises:

a plurality of first transmitters located along the first side of the runway, each first transmitter propagating an unmodulated signal with a distinct frequency relative to the other first transmitters; and a plurality of second transmitters located along the second side of the runway, each second transmitter propagating an unmodulated signal with a distinct frequency relative to the other second transmitters.

7. The air vehicle landing/takeoff area mapping system of claim 1 wherein the receiver further comprises:

a first stage for receiving the propagated signals; and a channelizer for frequency channelizing the signals, the channelizer having a separate output for each channel, the control logic being in communication with each output.

8. The air vehicle landing/takeoff area mapping system of claim 7 wherein the receiver further comprises:

at least one frequency downconversion stage between the first stage and the channelizer.

9. The air vehicle landing/takeoff area mapping system of claim 1 further comprising:

a storage medium having information stored thereon representing pre-assigned transmitter locations based on frequency, wherein the control logic produces the landing/takeoff area image further based on the stored information.

10. An air vehicle landing/takeoff area mapping system comprising:

a plurality of transmitters located in the landing/takeoff area, each transmitter propagating an effectively unmodulated signal having a frequency indicative of transmitter location;

a non-camera receiver having a scanning antenna located on the air vehicle and operative to scan the landing/takeoff area, the receiver being further operative to process a received transmitter signal to produce an output based on the received transmitter signal frequency;

a display device located within the air vehicle; and control logic for processing receiver information including a sequence of receiver outputs, corresponding receiver azimuth scan angles, and corresponding receiver elevation scan angles to produce an image of the landing/takeoff area on the display device to assist a pilot during landings and takeoffs of the air vehicle.

11. The air vehicle landing/takeoff area mapping system of claim 10 wherein the control logic further processes air vehicle avionics information including altitude, heading angle, and pitch angle to produce the landing/takeoff area image on the display device.

12. The air vehicle landing/takeoff area mapping system of claim 10 wherein each transmitter has a substantially hemispherical antenna field pattern.

13. The air vehicle landing/takeoff area mapping system of claim 10 wherein the propagated signals are continuous wave signals.

14. The air vehicle landing/takeoff area mapping system of claim 13 wherein the propagated signals are millimeter waves.

15. The air vehicle landing/takeoff area mapping system of claim 13 wherein the propagated signals are microwave band waves.

16. The air vehicle landing/takeoff area mapping system of claim 10 wherein the landing/takeoff area is a runway having first and second sides, and the plurality of transmitters further comprises:

a plurality of first transmitters located along the first side of the runway, each first transmitter propagating an unmodulated signal with a distinct frequency relative to the other first transmitters; and a plurality of second transmitters located along the second side of the runway, each second transmitter propagating an unmodulated signal with a distinct frequency relative to the other second transmitters.

17. The air vehicle landing/takeoff area mapping system of claim 10 wherein the receiver further comprises:

a first stage for receiving the propagated signals; and a channelizer for frequency channelizing the signals, the channelizer having a separate output for each channel, the control logic being in communication with each output.

18. The air vehicle landing/takeoff area mapping system of claim 17 wherein the receiver further comprises:

at least one frequency downconversion stage between the first stage and the channelizer.

19. The air vehicle landing/takeoff area mapping system of claim 10 further comprising:

a storage medium having information stored thereon representing pre-assigned transmitter locations based on frequency, wherein the control logic produces the landing/takeoff area image further based on the stored information.

20. A method of mapping an air vehicle landing/takeoff area, the method comprising:

propagating a plurality of effectively unmodulated signals from a corresponding plurality of locations in the landing/takeoff area, each signal having a frequency indicative of the corresponding location;

scanning the landing/takeoff area with a non-camera receiver from an air vehicle to provide a plurality of received signals;

processing each received signal to produce an output based on the frequency of each received signal; and processing a sequence of outputs to produce an image of the landing/takeoff area on a display device located within the air vehicle to assist a pilot during landings and takeoffs of the air vehicle.

* * * * *